United States Patent
Eckles et al.

(10) Patent No.: US 7,964,083 B2
(45) Date of Patent: Jun. 21, 2011

(54) POLYAMINE BRIGHTENING AGENT

(75) Inventors: William E. Eckles, Cleveland Heights, OH (US); Thorsten Kuehler, Bielefeld (DE)

(73) Assignee: Taskem, Inc., Brooklyn Heights, OH (US)

( * ) Notice: Subject to any disclaimer, the term of this patent is extended or adjusted under 35 U.S.C. 154(b) by 1269 days.

(21) Appl. No.: 10/591,012

(22) PCT Filed: Feb. 28, 2005

(86) PCT No.: PCT/US2005/006379
§ 371 (c)(1), (2), (4) Date: Aug. 29, 2006

(87) PCT Pub. No.: WO2005/093132
PCT Pub. Date: Oct. 6, 2005

(65) Prior Publication Data
US 2008/0223726 A1    Sep. 18, 2008

Related U.S. Application Data

(60) Provisional application No. 60/550,167, filed on Mar. 4, 2004.

(51) Int. Cl.
*C25D 3/56* (2006.01)
*C25D 3/22* (2006.01)
*C25D 3/24* (2006.01)
*B22F 7/00* (2006.01)

(52) U.S. Cl. ........ 205/244; 205/305; 205/308; 205/311; 205/314; 106/1.29

(58) Field of Classification Search ........... 106/1.29; 205/244, 305, 308, 309, 310, 311, 312, 313, 205/314
See application file for complete search history.

(56) References Cited

U.S. PATENT DOCUMENTS

| | | | | |
|---|---|---|---|---|
| 4,071,418 A | | 1/1978 | James | 204/55 R |
| 4,071,419 A | | 1/1978 | James | 204/55 R |
| 4,169,771 A | * | 10/1979 | Creutz et al. | 205/312 |
| 4,210,500 A | | 7/1980 | Bishop | 204/55 Y |
| 4,506,081 A | * | 3/1985 | Fenyes et al. | 548/523 |
| 4,730,022 A | | 3/1988 | Willis | 524/800 |
| 4,889,602 A | | 12/1989 | Oshima et al. | 204/38.1 |
| 5,405,523 A | | 4/1995 | Eckles | 205/245 |
| 5,417,840 A | | 5/1995 | Block et al. | 205/246 |
| 5,435,898 A | | 7/1995 | Commander et al. | 205/245 |
| 6,436,269 B1 | | 8/2002 | Opaskar et al. | 205/253 |
| 6,468,411 B1 | | 10/2002 | Eckles et al. | 205/246 |
| 6,652,728 B1 | * | 11/2003 | Sonntag et al. | 205/143 |
| 2003/0192785 A1 | | 10/2003 | Herdman et al. | 205/244 |

FOREIGN PATENT DOCUMENTS

WO    WO 0014305 A1 *   3/2000

* cited by examiner

*Primary Examiner* — Edna Wong
(74) *Attorney, Agent, or Firm* — Tarolli, Sundheim, Covell & Tummino LLP

(57) ABSTRACT

A zinc electroplating bath includes zinc ions and a brightening agent. The brightening agent is a polyamine or a mixture of polyamines that include a quaternary ammonium group.

3 Claims, 1 Drawing Sheet

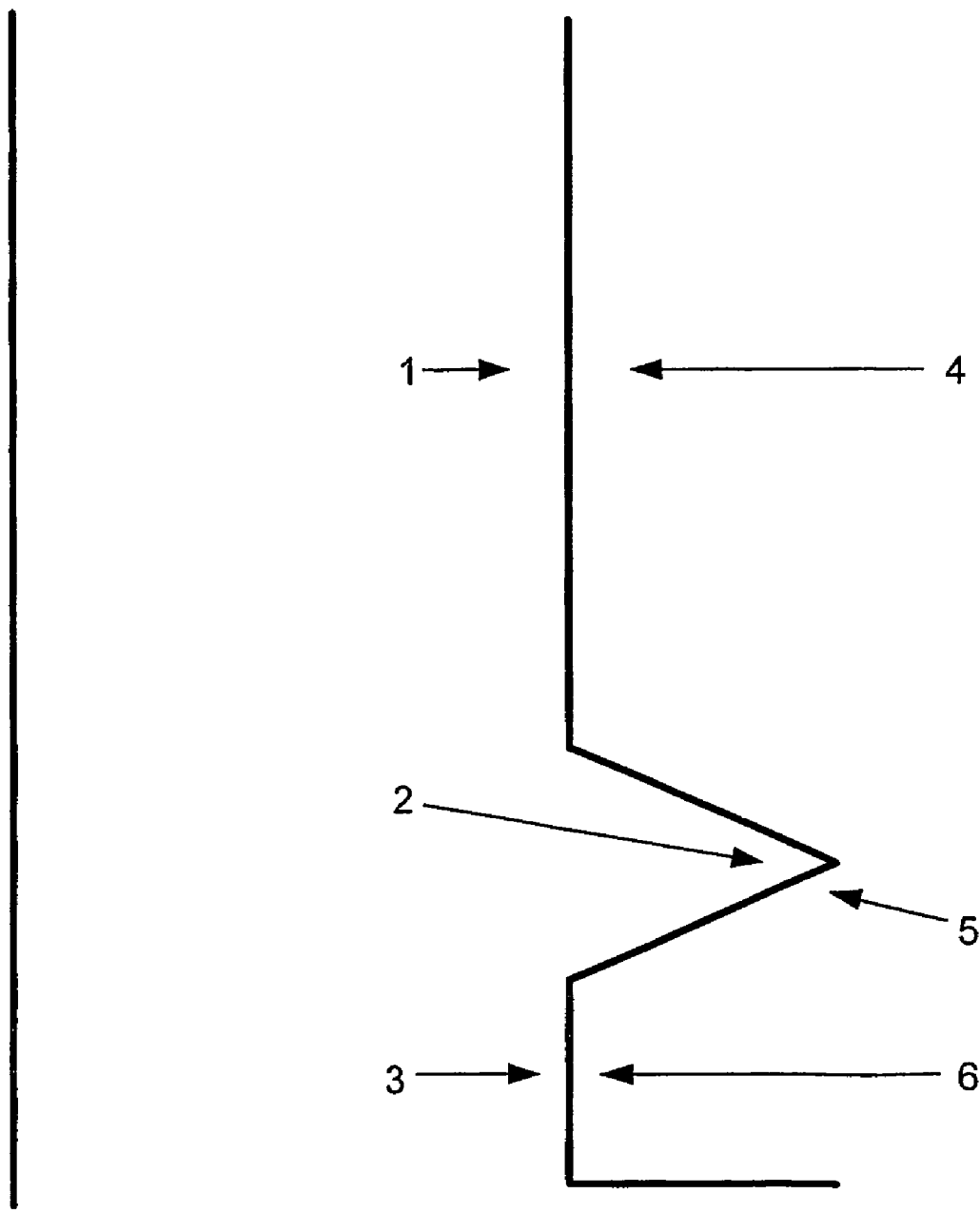
Fig.

POLYAMINE BRIGHTENING AGENT

RELATED APPLICATION

This application claims the benefit of U.S. Provisional Application No. 60/550,167, filed Mar. 4, 2004 and which is incorporated herein by reference.

TECHNICAL FIELD

The present invention relates to a polyamine, and, more particularly, a polyamine brightening agent for an electroplating bath.

BACKGROUND

U.S. Pat. No. 4,889,602 discloses an alkaline zinc-nickel electroplating bath, which comprises an aliphatic amine or polymer of an aliphatic amine in combination with an hydroxyaliphatic carboxylic acid.

U.S. Pat. Nos. 4,071,418 and 4,071,419 disclose the combination of amines with substituted pyridines, such as nicotinic acid or nicotinamide for a zinc bath.

U.S. Pat. No. 5,417,840 discloses an alkaline zinc-nickel plating bath comprising the combination of a polyamine, such as polyethyleneimine, in combination with an aromatic heterocyclic nitrogen containing compound such as a sulfobetaine, (e.g., pyridinium-N-propane-3-sulfonic acid); or a pyridinium chloride, such as N-carboxymethylpyridinium chloride.

U.S. Pat. Nos. 4,210,500 and 4,730,022 disclose the use of an aromatic carboxyl compound such as 1-benzyl-pyridinium-3-carboxylate or 3-pyridine carboxylic acid (nicotinic acid) as a supplementary brightener in an alkaline zinc bath. The carboxyl compounds are used in combination with a primary brightener, such as the reaction product of a polyamine and a sulfonate.

U.S. Pat. No. 5,405,523 discloses a zinc alloy electroplating bath comprising a ureylene quaternary ammonium polymer as a brightening agent. The quaternary ammonium polymer can include units of the general formula:

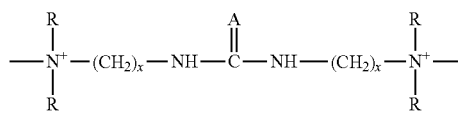

where A may be O, S, or N, and R may be, inter alia, methyl, ethyl, or isopropyl. In the preferred polymers, these units are linked by units derived from, for example, a bis(2-haloethyl) ether, a (halomethyl)oxirane or a 2,2'-(ethylenedioxy)-diethylhalide.

U.S. Pat. No. 5,435,898 describes polymers for use as additives in the electrodeposition of zinc and zinc alloys. The polymers have the general formula:

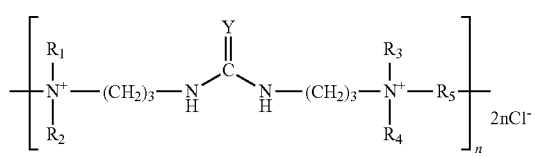

where $R_1$ to $R_4$ may be the same or different and are, inter alia, methyl, ethyl, or isopropyl and Y may be S or O, and $R_5$ is an ether linkage, such as $(CH_2)_2O(CH_2)_2$.

U.S. Pat. No. 6,652,728 describes polymers for use as additives in the electrodeposition of zinc or zinc alloys. The polymers have the general formula:

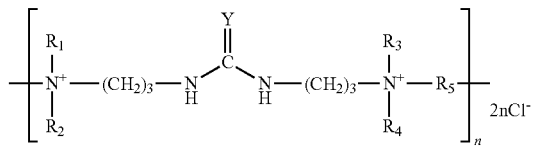

U.S. Patent Application Publication No. 2003/0192785 describes an additive for zinc or zinc alloy electroplating bath medium. The additive comprises a random copolymer comprising the reaction product of one or more ditertiary amines including an amide or thioamide functional group, and optionally one or more saturated or unsaturated ditertiary amines with one or more saturated or unsaturated linking agents capable of reacting with the ditertiary amines.

SUMMARY OF THE INVENTION

The present invention relates to a zinc or zinc alloy electroplating bath. The electroplating bath includes zinc ions and a brightening agent. The brightening agent comprises at least one polyamine or a mixture of polyamines. The at least one polyamine or mixture of polyamines includes a first repeating unit that has the general formula:

(1)

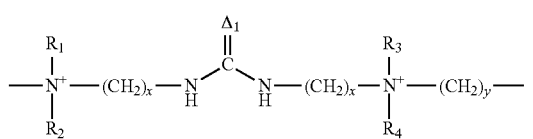

and a second repeating unit selected from the group consisting of (2A)

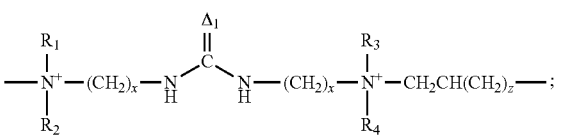

(2B)

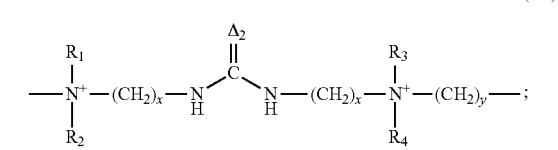

(2C)

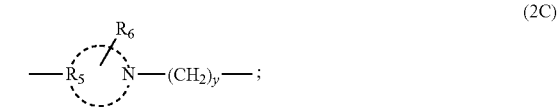

and combinations thereof;

where $\Delta_1$ is O, N, or S; $\Delta_2$ is O, N, or S, and $\Delta_2$ is not the same as $\Delta_1$ (i.e., $\Delta_2 \neq \Delta_1$); x is an integer from 2 to 6; y is an integer from 1 to 6; z is an integer from 1 to 6; $R_1$, $R_2$, $R_3$, and $R_4$, which may be the same or different, is methyl, ethyl, isopropyl, n-propyl, hydroxyethyl, or —$CH_2CH_2$ ($OCH_2CH_2$)$_m$OH; m is a number between 0-6; $R_5$ represents a group of atoms necessary to complete a heterocyclic compound having a five or six membered ring containing at least two nitrogen atoms, and $R_6$ is nothing or an alkyl group.

Another aspect of the present invention relates to a brightening agent for an alkaline zinc or zinc alloy electroplating bath. The brightening agent comprises a copolymer of a first monomer having the following formula:

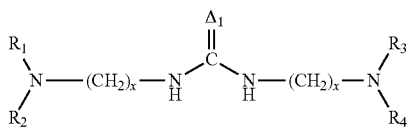

and at least two of the following compounds selected from the group consisting of:

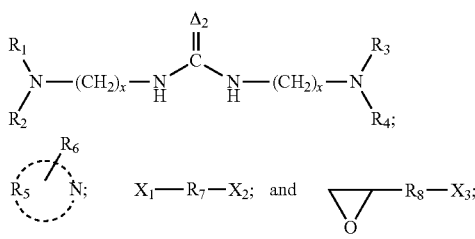

where $\Delta_1$ is O, N, or S; $\Delta_2$ is O, N, or S, and $\Delta_2$ is not the same as $\Delta_1$ ($\Delta_2 \neq \Delta_1$); x is an integer from 2 to 6; $R_1$, $R_2$, $R_3$, and $R_4$, which is the same or different, is methyl, ethyl, isopropyl, n-propyl, hydroxyethyl, or —$CH_2CH_2(OCH_2CH_2)_m$OH; m is a number between 0-6; $R_5$ represents a group of atoms necessary to complete a heterocyclic compound having a five or six membered ring containing at least two nitrogen atoms; $R_6$ is nothing or an allyl group; $R_7$ and $R_8$, which may be the same or different, is an alkylene group; and $X_1$, $X_2$, and $X_3$, which is the same or different, is a halogen.

BRIEF DESCRIPTION OF THE DRAWING

The foregoing and other aspects of the present invention will become apparent to those skilled in the art to which the present invention relates upon reading the following description with reference to the accompanying drawing.

The FIGURE (FIG.) is a schematic illustration of "Jiggle Cell" panel used in a plating test in accordance with the present invention.

DETAILED DESCRIPTION

The present invention relates to a brightening agent for a zinc or zinc alloy electroplating bath (e.g., alkaline zinc or zinc alloy electroplating bath). The electroplating bath can be used to form zinc or zinc alloy coatings on electrically conductive substrates, which are provided in the electroplating bath. Examples of electrically conductive substrates that can be electroplated include iron, ferrous based substrates (e.g., iron alloys and steel), aluminum, aluminum alloys, magnesium, magnesium alloys, copper, copper alloys, nickel, nickel alloys, zinc, and zinc alloys. The brightening agent provides the electrodeposited zinc or zinc alloy coatings with improved brightness and leveling as well as mitigates blistering of the zinc or zinc alloy coatings.

The brightening agent of the present invention comprises a polyamine or a mixture of polyamines that are soluble in the electroplating bath. The polyamine or mixture of polyamines include one or more quaternary ammonium groups and/or secondary amines. More specifically, the polyamine and mixture of polyamines include a first repeating unit that has the general formula:

(1)

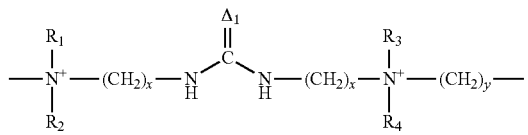

where $\Delta_1$ is O, N, or S, x is an integer from 2 to 6, y is an integer from 1 to 6, $R_1$, $R_2$, $R_3$, and $R_4$, which may be the same or different, is methyl, ethyl, isopropyl, n-propyl, hydroxyethyl, or —$CH_2CH_2(OCH_2CH_2)_m$OH, and m is a number between 0-6; and a second repeating unit selected from group consisting of:

(2A)

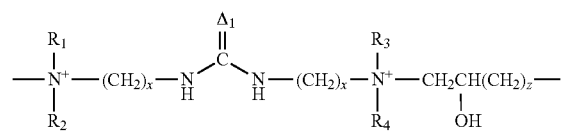

where $\Delta_1$ is defined as above, x is an integer from 2 to 6, z is an integer from 1 to 6, and $R_1$, $R_2$, $R_3$, and $R_4$, are defined as above;

(2B)

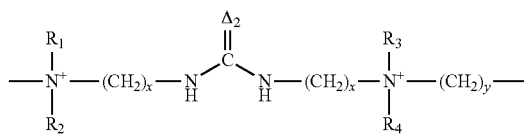

where $\Delta_2$ is O, N, or S, and $\Delta_2$ is not the same as $\Delta_1$ (i.e., $\Delta_2 \neq \Delta_1$), x is an integer from 2 to 6, y is an integer from 1 to 6, and $R_1$, $R_2$, $R_3$, and $R_4$ are defined as above;

(2C)

where $R_5$ represents a group of atoms necessary to complete a heterocyclic compound having a five or six membered ring containing at least two nitrogen atoms (e.g., piperazine, imidazole, pyrazole, and pyrazine), $R_6$ is nothing or an alkyl group, and y is an integer from 1 to 6 (e.g., methyl, ethyl, isopropyl, and butyl); and combinations thereof.

The polyamine or mixture of polyamines can be formed, for example, in a condensation reaction from a ditertiary amine monomer of the general formula:

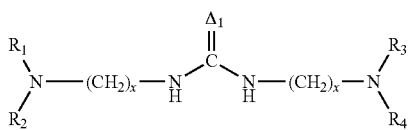
(3)

where $\Delta_1$ is defined as above, x is an integer from 2 to 6, and $R_1$, $R_2$, $R_3$, and $R_4$, are defined as above (e.g., N,N'-bis-(3-(dimethylamino)propyl)urea, N,N'-bis-(3-(dimethylamino)propyl)guanidine, and N,N'-bis-(3-(dimethylamino)propyl)thiourea); and at least two of the following monomers or linking agents:

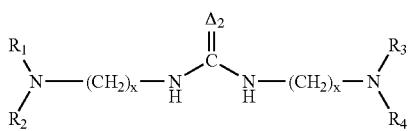
(4A)

where $\Delta_2$ is defined as above, x is an integer from 2 to 6, and $R_1$, $R_2$, $R_3$, and $R_4$ are defined as above (e.g., N,N'-bis-(3-(dimethylamino)propyl)urea, N,N'-bis-(3-(dimethylamino)propyl)guanidine, and N,N'-bis-(3-(dimethylamino)propyl)thiourea);

(4B)

where $R_5$ and $R_6$ are defined as above, (e.g., piperazine, imidazole, pyrazole, and pyrazine);

$$X_1-R_7-X_2 \quad (4C)$$

where $X_1$ is a halogen, such as Cl, Br, or I, $X_2$ is a halogen, such as Cl, Br, or I, and $R_7$ is an alkylene group, such as methylene, ethylene, propylene, or butylene (e.g., ethylene dibromide and trimethylene chlorobromide (TMCB)); and

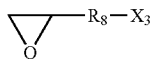
(4D)

where $R_8$ is an alkylene group, such as methylene, ethylene, propylene, or butylene and $X_3$ is a halogen, such as Cl, Br, or I (e.g., epichlorohydrin).

The polyamine or mixture of polyamines that are used to form the brightening agent in accordance with the invention can have an average molecular weight of about 350 to about 10,000. By way of example, the average molecular weight of the polyamine or mixture of polyamines is about 2000 to about 5000.

In an aspect of the invention, the brightening agent can comprise a mixture of a first polyamine and a second polyamine. The first polyamine can include the first repeating unit (1) and have the general formula:

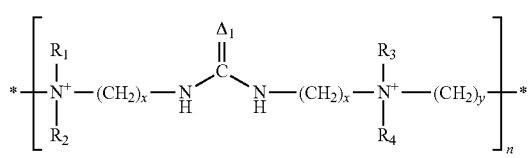
(5)

where $\Delta_1$ is defined as above, x is an integer from 2 to 6, y is an integer from 2 to 6, $R_1$, $R_2$, $R_3$, and $R_4$, are defined as above, and n is an integer from 2 to 20.

The first polyamine can be prepared by first forming a ditertiary amine monomer of the formula (3). The ditertiary amine monomer can be the condensation product of a ditertiary amine containing one tertiary amine group and either one primary or one secondary amine group (e.g., dimethylaminopropylamine (DMAPA)) and one mole of urea, thiourea, or guanidine. Examples of this ditertiary amine monomers include N,N'-bis-(3-(dimethylamino)propyl)urea, N,N'-bis-(3-(dimethylamino)propyl)guanidine, and N,N'-bis-(3-(dimethylamino)propyl)thiourea.

This monomer can be reacted in a second condensation reaction with an alkylene dihalide, such as ethylene dihalide (e.g., ethylene dichloride or ethylene dibromide), propylene dihalide (e.g., trimethylenechlorobromide (TMCB)), and butylene dihalide. Other allylene dihalides can also be used.

The second condensation reaction gives the first polyamine of formula (5). An example of a specific polymer has the following formula:

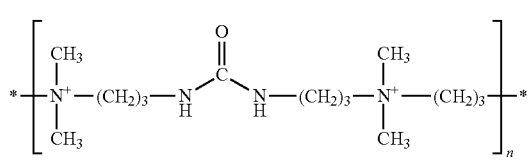
(6)

The second polyamine that is mixed with the first polyamine to form the brightening agent can include at least one of the second repeating units (2A, 2B, and/or 2C). An example of a second polyamine comprising the second repeating unit has the general formula:

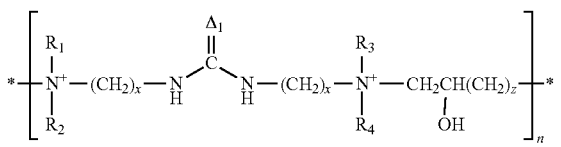
(7)

where $\Delta_1$ is defined as above, x is an integer from 2 to 6, z is an integer from 1 to 6, $R_1$, $R_2$, $R_3$, and $R_4$, are defined as above, and n is an integer from about 2 to 20.

This second polyamine, like the first polyamine, can be prepared by reacting a ditertiary amine monomer, such as the ditertiary amine monomer of the formula (3) (e.g., N,N'-bis-(3-(dimethylamino)propyl)urea, N,N'-bis-(3-(dimethylamino)propyl)guanidine, and N,N'-bis-(3-(dimethylamino)propyl)thiourea). in a condensation reaction with a haloalkyl oxirane, such as 1-chloro-2,3-epoxy-propane (i.e., epichlorohydrin) or 1-chloro-3,4-epoxy butane, to form the second polyamine of the formula (7). An example of a specific polyamine has the formula:

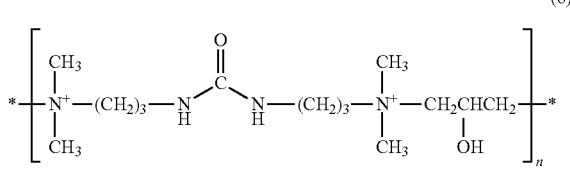

(8)

Another example of a second polyamine that can be mixed with the first polyamine to form an additive in accordance with the present invention has the general formula:

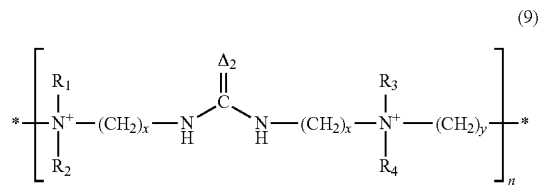

(9)

where $\Delta_2$ is defined as above, x is an integer from 2 to 6, y is an integer from 1 to 6, and $R_1$, $R_2$, $R_3$, and $R_4$ are defined as above, and n is a number between about 2 and about 20.

This second polyamine, like the first polyamine, can be prepared by a condensation reaction from a ditertiary amine monomer, such as the ditertiary amine monomer of the formula (4A). Examples of specific ditertiary amine monomers that can be used to form the second polyamine will depend on the specific ditertiary amine monomer used to form the first polyamine, but can include N,N'-bis-(3-(dimethylamino)propyl)urea, N,N'-bis-(3-(dimethylamino)propyl)guanidine, and N,N'-bis-(3-(dimethylamino)propyl)thiourea.

The ditertiary amine monomer can be reacted in a condensation reaction with an alkyl dihalide (e.g., TMCB) to form a polyamine that has the general formula (9). An example of a specific polyamine formed by the condensation reaction has the following formula:

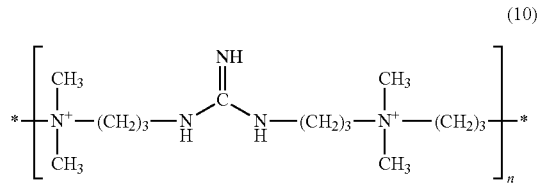

(10)

The first polyamine and the second polyamine can be mixed together to form the brightening agent in accordance with the present invention. For example, the additive can comprise a mixture of a first polyamine that has the formula (6) and a second polyamine that has the formula (8). In another example, the additive can comprise a mixture of a first polyamine that has the formula (6) and a second polyamine that has the formula (10).

The ratio of the first polyamine to the second polyamine used to form the brightening agent in accordance with the present invention can be varied as desired to influence the properties of the electrodeposited coating produced by the electroplating bath. Typically, a brightening agent that includes a higher molar ratio of the guanidino or heterocyclic groups when used in a electroplating bath of the present invention, can provide a brighter deposit or coating. The deposit or coating with the higher molar ratio of guanidino or heterocylic groups can have a poorer metal distribution. In contrast, brightening agents that include a higher molar ratio of urea groups can have an improved metal distribution, but not be as bright. The molar ratio of the first polyamine to second polyamine included in the brightening agent can therefore be adjusted to influence the properties of the brightening and be, for example, from about 1 to about 10 to about 10 to about 1. This molar ratio can be higher or lower depending on the specific properties desired.

The brightening agent can include other polyamines in addition to the first polyamine and the second polyamine described above. The additional polyamines can comprise at least one of the second repeating units, such as one of the repeating units not used to form the second polyamine, as well as additional repeating units.

Optionally, instead of mixing the first polyamine with the second polyamine to form the brightening agent in accordance with the present invention, the first polyamine can be copolymerized with the second polyamine to form a block copolymer. The block copolymer can include a first block comprising the first repeating unit (1) and a second block that comprises the second repeating unit (e.g., 2A, 2B, or 2C). The block copolymer can be formed, for example, by initially preparing the first polyamine and the second polyamine with terminal amine groups, and then reacting the first polyamine and the second polyamine with a linking agent, such as an alkylene dihalide or haloalkyl oxirane. It will be appreciated that the first polyamine and the second polyamine can be copolymerized using other linking agents and by other reaction methods.

In another aspect of the invention, the first repeating unit and the second repeating unit can be provided in the polymer chain of the same polyamine copolymer. The polyamine copolymer can be a random copolymer (or statistical copolymer), where the first repeating unit and the at least one second repeating unit are distributed randomly in the polymer chain, an alternating copolymer, where the first repeating unit and the at least one second repeating unit are distributed in a regular alternating fashion in the chain, or a block copolymer, where a long sequence or block of the first repeating unit and the at least one second repeating unit are joined to a block of the at least one second repeating unit.

One example of a copolymer includes a first repeating unit of the formula (1) and a second repeating unit of the formula (2A). The copolymer can be prepared by polymerizing a ditertiary amine monomer of the formula (3) (e.g., N,N'-bis-(3-(dimethylamino)propyl)urea, N,N'-bis-(3-(dimethylamino)propyl)guanidine, and N,N'-bis-(3-(dimethylamino) propyl)thiourea) with an alkyl dihalide (e.g., TMCB) and an haloalkyl oxirane (e.g., epichlorhydrin) as shown in the following reaction scheme:

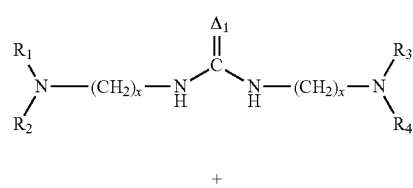

+

-continued $$X_1\text{—}R_7\text{—}X_2 \longrightarrow$$

$$\overset{+}{\underset{O}{\triangle}}\text{—}R_8\text{—}X_3$$

where $\Delta_1$ is defined as above, x is an integer from 2 to 6, $R_1$, $R_2$, $R_3$, and $R_4$, are defined as above, $X_1$ is a halogen, such as Cl, Br, or I, $X_2$ is a halogen, such as Cl, Br, or I, $R_7$ is an alkylene group, such as methylene, ethylene, propylene, or butylene, $R_8$ is an allylene group, such as methylene, ethylene, and propylene, and $X_3$ is a halogen, such as Cl, Br, or I.

In this example, the ditertiary amine monomer of formula (3) (e.g., N,N'-bis-(3-(dimethylamino)propyl)urea, N,N'-bis-(3-(dimethylamino)propyl)guanidine, and N,N'-bis-(3-(dimethylamino)propyl)thiourea) can be initially mixed and reacted in a first condensation reaction with the alkylene dihalide (e.g., TMCB). After allowing the first ditertiary amine and the alkylene dihalide to at least partially react, the haloalkyl oxirane (e.g., epichlorhydrin) can be added to the reaction mixture to complete the reaction and form the copolymer. Alternatively, the ditertiary amine monomer can be initially mixed and reacted in a first condensation reaction with the haloalkyl oxirane (e.g., epichlorohydrin). After allowing the ditertiary amine monomer and the haloalkyl oxirane to at least partially react, the alkylene dihalide (e.g., TMCB) can be added to the reaction mixture to complete the reaction and form the copolymer.

The molar ratio of the first repeating unit (1) relative to the second repeating unit (2) in this copolymer can be varied by varying the molar ratios of allylene dihalide and haloalkyloxirane used in the reaction. Varying the molar ratio of the alkylene dihalide to the haloalkyl oxirane in the reaction can influence the properties of the electrodeposited coating produced by the electroplating bath. Increasing the molar ratio of the haloalkyl oxirane to the alkylene dihalide results in a brightening agent that provides an improved grain refining effect to a deposit or coating. Increasing the molar ratio of the haloalkyl oxirane to the alkylene dihalide, however, reduces the efficiency of the electroplating bath. Accordingly, the molar ratio of the haloalkyl oxirane to alkylene dihalide used to form the brightening agent can be, for example, about 1 to about 10, to about 10 to about 1. It should be appreciated that this molar ratio can be higher or lower depending on the specific properties desired.

Another example of a copolymer used to form a brightening agent in accordance with the present invention includes a first repeating unit of the formula (1) and a second repeating unit of the formula (2B). The copolymer can be prepared by polymerizing the ditertiary amine monomer of formula (6) (e.g., N,N'-bis-(3 (dimethylamino)propyl)urea) and a ditertiary amine monomer with formula (10) (e.g., N,N'-bis-(3-(dimethylamino)propyl)guanidine) with an allylene dihalide (e.g., TMCB) as shown in the following reaction scheme:

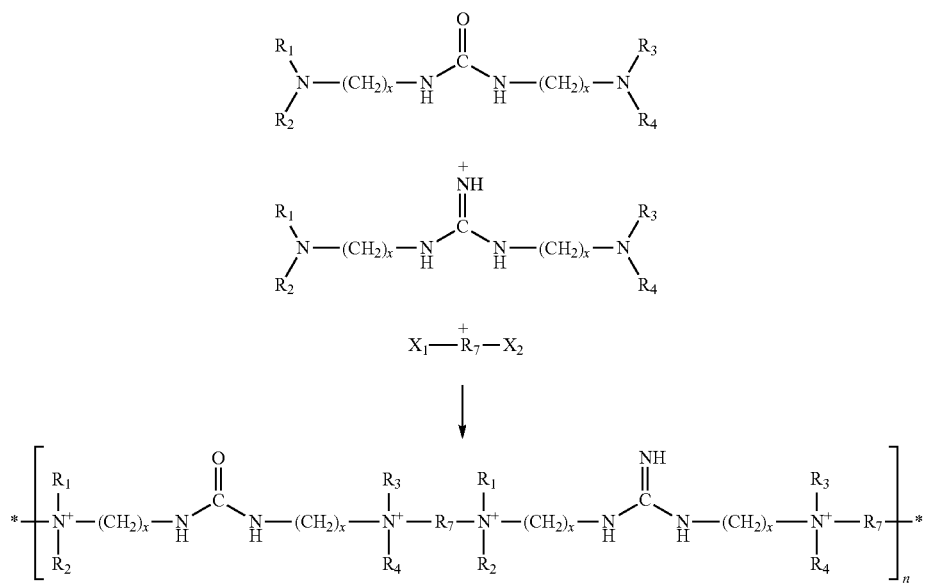

In this example, the N,N'-bis-(3-(dimethylamino)propyl)urea) and the N,N'-bis-(3-(dimethylamino)propyl)guanidine can be initially mixed. The mixture can then be reacted in a condensation reaction with the alkylene dihalide (e.g., TMCB) to complete the reaction and form the copolymer.

The molar ratio of the N,N'-bis-(3-(dimethylamino)propyl)urea) to the N,N'-bis-(3-(dimethylamino)propyl)guanidine used to form this copolymer can be varied to influence the properties of the electrodeposited coating produced by the electroplating bath. Increasing the molar ratio of the N,N'-bis-(3-(dimethylamino)propyl)guanidine to the N,N'-bis-(3-(dimethylamino)propyl)urea) results in a brightening agent that provides a brighter deposit or coating, but a less uniform deposit or coating (i.e., less uniform metal distribution). Conversely, increasing the molar ratio of the N,N'-bis-(3-(dimethylamino)propyl)urea) to the N,N'-bis-(3-(dimethylamino)propyl)guanidine results in a brightening agent that provides a more uniform deposit or coating distribution, but a less bright (or duller) deposit. Accordingly, the molar ratio of the N,N'-bis-(3-(dimethylamino)propyl)urea) to the N,N'-bis-(3-(dimethylamino)propyl)guanidine used to form this copolymer can be varied, for example, from about 1 to about 10 to about 10 to about 1. It will be appreciated that this molar ratio can be higher or lower depending on the specific properties desired.

Yet another example of a copolymer used to form a brightening agent in accordance with the present invention includes a first repeating unit of the formula (1) and a second repeating unit of the formula (2C). The copolymer can be prepared by polymerizing the ditertiary amine monomer of the formula (3) (e.g., N,N'-bis-(3-(dimethylamino)propyl)urea) and a heterocyclic amine monomer of the formula (4B) (e.g., piperazine, imidazole, pyrazole, and pyrazine) with a allylene dihalide (e.g., TMCB) as shown in the following reaction scheme:

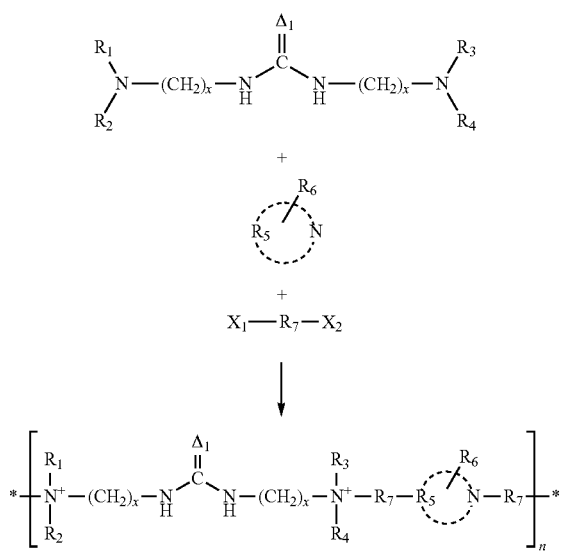

In this example, the ditertiary amine monomer of formula (3) and the heterocyclic amine monomer of the formula (4B) (e.g., piperazine, imidazole, pyrazole, and pyrazine) can be initially mixed. The mixture can then be reacted in a condensation reaction with the alkylene dihalide (e.g., TMCB) to complete the reaction and form the copolymer.

The molar ratio of the ditertiary amine monomer of formula (4) to the heterocyclic amine monomer (4B) used to form this copolymer can be varied to influence the properties of the electrodeposited coating produced by the electroplating bath. Increasing the molar ratio of the heterocyclic amine monomer to the ditertiary amine monomer can result in a brightening agent that provides a brighter deposit or coating, but can provide a less efficient electroplating bath. Accordingly, as with the other copolymers, the molar ratio of the ditertiary amine monomer to the heterocyclic amine monomer used to form this copolymer can be varied, for example, from about 1 to about 10 to about 10 to about 1. It will be appreciated that this molar ratio can be higher or lower depending on the specific properties desired.

Still another example of a copolymer used to form a brightening agent in accordance with the present invention includes a first repeating unit of the formula (1), a second repeating unit of the formula (2A), and a second repeating unit of the formula (2C). The copolymer can be prepared by polymerizing the ditertiary amine monomer of the formula (3) (e.g., N,N'-bis-(3-(dimethylamino)propyl)urea) and a heterocyclic amine monomer of the formula (4B) (e.g., piperazine, imidazole, pyrazole, and pyrazine) with a alkylene dihalide (e.g., TMCB) and a haloalkyloxirane (e.g., epichlorhydrin) as shown in the following reaction scheme:

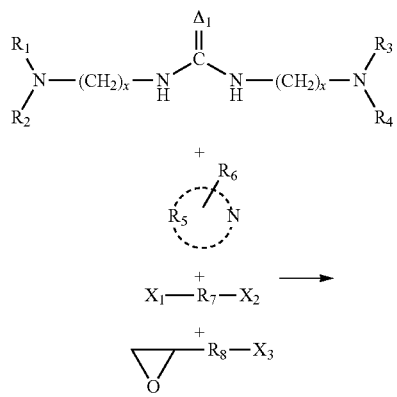

In this example, the ditertiary amine monomer of formula (3) and the heterocyclic amine monomer of the formula (4B) can be initially mixed. The mixture can then be reacted in a condensation reaction with the alkylene dihalide (e.g., TMCB). After allowing the ditertiary amine monomer, the heterocyclic monomer, and the alkylene dihalide to at least partially react, the haloalkyl oxirane (e.g., epichlorhydrin) can be added to the reaction mixture to complete the reaction and form the copolymer.

The molar ratio of the heterocylic amine monomer, ditertiary amine monomer, haloalkyl oxirane, and alkylene dihalide can all be adjusted, as discussed above, to affect the properties of the brightening agent and the electrodeposited coating. Accordingly, the molar ratios of the heterocyclic amine monomer, ditertiary amine monomer, haloalkyl oxirane, and alkylene dihalide can be 1:1:1:1 or another ratio depending on the particular properties desired.

The amount of the brightening agent comprising the polyamine or mixture of polyamines of the present invention added to an electroplating bath is a brightening amount. Typically, the brightening agent can be added to the electroplating bath in an amount of about 50 to about 2,000 ppm (about 0.05 grams per liter to about 20 grams per liter) based on the weight of the bath.

The electroplating bath contains a controlled amount of zinc ions and optionally a controlled amount of one or more additional metal ions, which can alloy with the zinc to produce a desired result. The alloying metal ions that can be used in the present invention are from the first transition of the Periodic Table. Nickel, cobalt, iron, and combinations thereof are commonly used alloying materials, which are particularly useful in the present invention. Other examples of alloying metals that can be used in the present invention include manganese and chromium.

For an alkaline electroplating bath, zinc ions are usually provided by means of a zinc compound in combination with a strong base. The zinc compound can be any zinc compound that is soluble in an alkaline aqueous medium. Examples of zinc compounds, which can be added to the electroplating bath, are zinc oxide, or a soluble salt, such as zinc sulfate, zinc carbonate, zinc sulfamate, and zinc acetate. The concentration of zinc ions in the electroplating bath can be from about 1 to 100 grams per liter, preferably about 4 to about 50 grams per liter (about 4,000 to about 50,000 ppm).

The pH of the alkaline plating bath can be from about 9 to about 13 or higher, such as above about 14. At a pH above about 14, the predominant zinc species in the bath is the zincate ion. The bath contains a base in an effective amount to achieve this pH. Amounts of from about 50 grams per liter to about 200 grams per liter, based on the electroplating bath, of the base can be used. Examples of bases that can be used are alkali metal derivatives, such as sodium hydroxide, potassium hydroxide, sodium carbonate, and potassium carbonate.

Normally, the alkaline bath is prepared by dissolving the zinc oxide or zinc salt in a commercially available caustic solution and then adjusting the concentration of the solution to that desired by adding water to the solution. For instance, 10 grams of zinc oxide can be dissolved in 75 ml of a 50% caustic solution, which is then diluted to the desired volume percent by the addition of water. If desired, the pH of the bath can be adjusted by adding to the bath the parent base of the zinc salt, or another base, such as sodium or potassium carbonate.

The concentration of the zinc ions in the bath, for an electroplating bath, can vary in accordance with conventional practice. The zinc ion concentration typically ranges from about 4,000 ppm (about 4 grams per liter) to about 50,000 ppm (about 50 grams per liter). For an acid bath, the concentration of zinc ions typically is at the high end of this range.

The alloying metal ions can also be introduced into the bath in the form of an oxide or sulfate in the case of an alkaline bath or in the form of an aqueous soluble salt, such as a chloride, sulfate, fluoroborate, acetate, or sulfamate, in the case of an acid bath. The concentration range of the alloying metal ions, in the practice of the present invention, typically is in the range between about 20 ppm to about 20,000 ppm (about 0.02 to about 20 grams per liter). These concentrations refer to the amount of metal ions contained in the bath. The amounts of the salts of these metals to be used in each case are determined by appropriate calculation.

If combinations of alloying metals are used, each alloying metal can be present in the range of about 20 ppm to about 20,000 ppm. Normally, the amount of alloying metal ions in the bath will be in the weight range necessary to produce, in the plate which is deposited, about 0.1%-15% by weight alloying element. Additionally, since with different types of alloys a different proportion of alloy is also necessary in order for example to improve the corrosion protection, this concentration can be different from metal ion to metal ion.

In addition to the use of a polyamine or mixture of polyamine of the present invention, the electroplating bath can contain, as a supplemental brightener, conventional brighteners, such as sodium saccharin, anisic aldehyde, polyvinyl alcohol, polyethyleneimine, N-benzyl nicotinic acid (sodium salt), the reaction product of epichlorohydrin with an amine, and an aromatic aldehyde. These supplemental brighteners can be used in the bath of the present invention in conventional amounts, in combination with the polyamine compound of the present invention.

Other supplemental brighteners that can be used in the bath are described in U.S. Pat. No. 6,468,411 to Eckles et al. herein incorporated by reference in its entirety. These supplemental brighteners can include a pyridinium compound in which a lower alkyl, benzyl or naphthyl group or derivative thereof is substituted at the nitrogen atom of the pyridine ring and a group, which is either a carboxylate group or which can undergo alkaline hydrolysis to a carboxylate group is at the 3-position of the pyridine ring. Examples of these pyridinium compound brighteners can include 1-benzylpyridinium-3-carboxylate, 1-benzylpyridinium-3-carboxamide, 1-methylpyridinium-3-carboxylic acid (or salt thereof), 1-methylpyridinium-3-carboxamide and combinations thereof.

The supplemental brightener can also comprise a low molecular weight aliphatic polyamine, such as one having a molecular weight less than about 300. An example of an aliphatic polyamine is tetraethylenepentamine (TEPA), which has a molecular weight of about 189. Another example of an aliphatic polyamine is pentaethylenehexamine (PEHA) which has a molecular weight of about 232.

It is also possible to use heptaethyleneoctamine (molecular weight about 300) marketed by the Nippon Shokubai Co. Ltd. under the trademark "EPOMIN 003". Also diethylenetriamine (molecular weight about 103) can be used.

The bath can also comprise an aliphatic polyamine having a molecular weight above about 300 in combination with the low molecular weight aliphatic polyamine. An example of a higher molecular weight aliphatic polyamines that can be used is quadradecaethylenepentadecamine (molecular weight 600) marketed by Nippon Shokubar Co. Ltd. under the trademark "Epomin 006".

The electroplating bath of the present invention can also include a complexing agent, particularly if the baths according to the invention contain the aforementioned additional metal ions. Complexing agents adapted to these additional metal ions can be added to the bath in order to control the deposition potentials and permit a common reduction with the zinc ions that are present. Examples of complexing agents that can be added to an electroplating bath in accordance with the present invention are sorbitol, gluconic acid, heptanoic acid, tartaric acid, glycine, ethylenediamine tetraacetic acid, triethanolamine, salts thereof, and combinations thereof.

Other complexing agents, such as chelate-forming agents, can also be used. Examples of chelate-forming agents include hydroxycarboxylates such as sodium gluconate, aminoalcohols such as triethanolamine, polyamines such as polyethylenediamine, aminocarboxylates such as EDTA, aminophosphonates such as aminotris(methylenephosphonic acid), and polyhydric alcohols such as sorbitol or sucrose. The complexing agent may be contained individually or as a mixture in the baths according to the invention, the amount of the agent preferably being in the range from 2 to 200 g/l.

The electroplating baths according to the invention may furthermore contain known levelling agents such as 3-mercapto-1,2,4-triazole and/or thiourea, the latter being preferred. The concentration of the levelling agent is the normal concentration for use in zinc baths, and ranges for example from 0.01 to 0.50 g/l. Further additives for the baths according to the invention include aromatic aldehydes or their bisulfite adducts.

Examples of aromatic aldehydes include 4-hydroxybenzaldehyde, 4-hydroxy-3-methoxybenzaldehyde (vanillin), 3,4-dimethoxybenzaldehyde, 3,4-methylenedioxybenzaldehyde, 2-hydroxybenzaldehyde and 4-hydroxybenzaldehyde, or mixtures thereof. These additives, whose concentration is in the range from 0.005 to 1.0 g/l preferably from 0.01 to 0.50 g/l, act in a manner known per se as brightening agents. A particularly preferred example of such a brightening agent is vanillin. In addition the bath according to the invention may also contain other substances that can be used as brightening agents, such as substances selected from the group comprising sulfur compounds, aldehydes, ketones, amines, polyvinyl alcohol, polyvinyl pyrrolidone, proteins or reaction products of halogenated compounds with aliphatic or aromatic amines, polyamines or heterocyclic nitrogen compounds, and mixtures thereof.

The baths according to the invention may also contain a water-softener, since the sensitivity of the bath according to the invention to foreign metal ions, in particular calcium and magnesium ions from tap water, is reduced by the use of such additives. Examples of such water-softener are EDTA, sodium silicates and tartaric acid.

The electroplating baths of the present invention are used at conventional current densities, preferably about 1 to 100 amps per square foot, as determined by Hull Cell evaluation. For example, the bath can be operated with an average cathode current density in the range of about 3 amps per square foot to about 25 amps per square foot, typically about 20 amps per square foot. The cathode current density is dependent upon the particular type of deposit desired. Bright deposits can be obtained at conventional temperatures, for instance about 20° C. to about 40° C.

The electrodeposition using the electroplating bath according to the invention may, for example, be carried out as a drum galvanizing process when used for mass parts, and as a frame galvanizing process for deposition on larger workpieces. In this connection anodes are used that may be soluble, such as for example zinc anodes, which at the same time serve as a source of zinc ions so that the zinc deposited on the cathode is recovered by dissolution of zinc at the anode. Alternatively insoluble anodes such as for example iron anodes may also be used, wherein the zinc ions removed from the electrolyte have to be replenished in another way, for example by using a zinc dissolving tank.

The following examples are included to demonstrate various aspects of the invention. Those of skill in the art should, in light of the present disclosure, appreciate that many changes can be made in the specific aspects which are disclosed and still obtain a like or similar result without departing from the spirit and scope of the invention.

EXAMPLES

Example 1

113.8 g guanidine hydrochloride (GHC/1.19 mol) and 300 mL/243.6 g dimethylamino propylamine (DMAPA/2.38 mol) were mixed in a 1 L three necked flask equipped with a condenser, an internal thermometer, an electric shaft stirrer, and an electric heating mantel. The guanidine hydrochloride dissolved immediately. The mixture was heated to reflux for 8 h. During this time the temperature rose to 210° C. and the color changed from colorless to amber. After cooling to room temperature a highly viscous amber substance was obtained. The IR spectrum showed the expected bands for the C=N bond and the different methyl and methylene groups together with the NH-bands.

Example 2

The product obtained in Example 1 was reacted with TMCB in different ways to evaluate its possible use as a brightening agent.

In a first reaction, 43 g guanidine.DMAPA (0.19 mol) was mixed with 18.6 mL TMCB (0.19 mol) in a flask with a magnetic stirrer and a condenser. The mixture was carefully heated. After approximately 10 minutes, the mixture erupted and formed a yellow foam in the flask. This solid residue was dissolved in 75 mL $H_2O$ to give a about 50% solution. A very small amount of unreacted TMCB was recovered by phase separation. The IR spectrum of the dry product showed that the bands for the aminomethyl groups had shifted in the expected way and the band for the methylene groups had increased in intensity and also shifted.

To determine the potential of the product as a brightener, a Hull cell test was performed. In the Hull cell test, 1 mL of the 50% solution was added to a Hull cell containing a solution of 11.5 g/L Zn, 1 mL Xenithe ANC WC (EDTA solution) and 0.2 mL Xenithe ANC Purifier (thiourea solution). A Hull cell panel was plated for 5 minutes at 3 A. The Hull Cell test yielded a bright panel with a thickness ratio of 1.7 between measurements taken at 2.5 and 7.5 cm from the left edge of the panel.

Example 3

This way of producing the polymer was not an option for industrial scale, and the metal distribution obtained with this material was not satisfactory. A different experimental setup was therefore tested.

229 g guanidine.DMAPA (1 mol) were put into a three necked flask with an internal thermometer, a shaft stirrer, a dropping funnel and a heating mantel and heated to about 90° C.

157 g/98 mL TMCB (1 mol) were added slowly over 35 minutes. During this time, the temperature rose to about 170° C., and the mixture became extremely viscous. After an additional 30 min. the residue could no longer be stirred. After cooling to room temperature, 386 mL of water were added to obtain an approx. 50% solution.

The IR spectrum was basically identical to that of the material obtained before. A Hull Cell test, in accordance with the Hull Cell plating test of Example 2 (3 A/5 minutes), was performed using the material. The Hull Cell test yielded a bright panel. The thickness ratio of the deposit at 2.5 and 7.5 cm from the left edge was determined to be r=1.8. A comparative panel obtained with the reaction product of ureadmapa and TMCB in a 1:1 ratio was found to be only semi bright but with a thickness ratio of r=1.2.

Example 4

The use of $H_2O$ as a solvent of guanidine.DMAPA and TMCB was investigated. 150 g of guanidine.DMAPA (0.66 mol) were dissolved in 170 mL $H_2O$ and heated to 80° C. 65 mL/103 g of TMCB (0.66 mol) were added over 30 minutes. During this time, the temperature was allowed to rise to 100° C. and the mixture started to reflux. The mixture was refluxed for 4 h while the temperature slowly rose to 105° C. After cooling to room temperature, approximately 2 mL of unreacted TMCB were separated.

The IR spectrum of the yellow product was identical to the one obtained from the reactions without solvent. A Hull Cell test, in accordance with the Hull Cell plating test of Example 2 (3 A/5 minutes), was performed using the material. The Hull Cell test yielded a semi bright panel. The degree of brightness of the other materials was not quite reached. The thickness ratio between the points at 2.5 and 7.5 cm from the left edge was determined to be r=1.7.

Example 5

To determine whether the pure metal distribution was affected by the unreacted TMCB, the reaction of guanidine DMAPA and TMCB was performed in a less polar solvent. Glycerol was selected because it is polar enough to dissolve the polymer, the boiling point is high enough to allow decent reaction rates and it has also been used as an additive in alkaline zinc plating. The latter reason would alleviate the obligation to remove the solvent.

150 g guanidine.DMAPA (0.66 mol) were dissolved in 130 ml of glycerol and the viscous mixture was heated to 90° C. 65 mL TMCB (0.66) were slowly added over 2 h. The temperature rose rapidly to 160° C., and the mixture turned dark. After cooling to room temperature an extremely viscous brown substance was obtained and a small amount (8 mL) of a colorless liquid separated on top. The colorless liquid was identified as TMCB by IR. The brown residue dissolved only very slowly in water. A small amount of the material was added to a Hull cell. The plating test at 3 A/5 min yielded a bright panel. The thickness ratio was determined at r=1.5.

Example 6

Linking the guanidine.DMAPA with epichlorohydrin was investigated. 57 g guanidine.DMAPA (0.25 mol) were dissolved in 80 mL $H_2O$ and heated to 70° C. 25 g/21 mL epichlorohydrin (0.27 mol) were added within 7 minutes while the temperature was allowed to rise to 101° C. and the solution began to reflux. The solution was heated to reflux for 2¼ h more. After cooling to room temperature an amber solution was obtained.

The IR spectrum after evaporation of water corresponded to the materials obtained from reaction with TMCB but additionally showed bands for C—OH groups. A Hull Cell plating test, in accordance with the Hull Cell plating test of Example 2 (3 A/5 minutes), was performed using the material. The Hull Cell test yielded a bright panel over the whole current density-range. The thickness ratio was determined to be r=1.7.

Example 7

The results of Examples 1-6 gave the impetus for the idea of polymerizing ureadmapa units with different linkers in one polymer. The general aspect obtained with the epichlorohydrin based polymer was an improvement in brightness as compared with the TMCB based polymers. On the other hand, the inhibiting effect was pronounced. It was therefore decided to polymerize ureadmapa with TMCB and epichlorohydrin in one polymer.

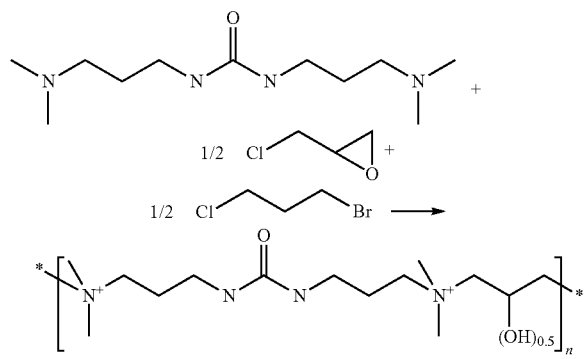

92 g ureadmapa (0.4 mol) were dissolved in 150 mL $H_2O$ and the light yellow solution was heated to 70° C. 31.5 g/20 mL TMCB (0.2 mol) were added within 5 minutes while the temperature was allowed to rise to 100° C. The solution was stirred at this temperature for 25 min and then cooled down to 65° C. within 30 minutes. 20.2 g/17 mL epichlorohydrin were added within 10 minutes and the temperature was allowed to rise to 85° C. The solution was then stirred for 2½ h at 70° C.-80° C. After cooling to room temperature, a viscous yellow liquid was obtained.

The IR spectrum of the material after evaporation of excess water was very similar to the product of the reaction with TMCB only. Additionally, some bands can be seen between 950 $cm^{-1}$ and 1150 $cm^{-1}$ that can be attributed to the additional C—OH functionality. A Hull Cell test, in accordance with the Hull Cell plating test of Example 2 (3 A/5 minutes), was performed using the material. The Hull Cell test yielded a panel that was uniformly semi-bright over the whole current density range. The thickness ratio between measurements taken at 2.5 and 7.5 cm from the left edge of the panel was r=1.1 with a very decent efficiency.

This result was very encouraging since it yielded a material that gave a good metal distribution together with a moderate degree of brightness. Generally speaking the brightness obtained with this molecule can be considered a substantial improvement as compared to Mirapol WT. The extreme effect observed with the epi-only derivative was not observed and it might be interesting to see if there is an influence of the reaction sequence on the performance of the material.

Example 8

Tests were performed to determine a TMCB/epichlorohydrin ratio that preserves the superior brightness as compared to Mirapol WT and still gives satisfactory current efficiency. To test this, ureadmapa was reacted with TMCB and epichlorohydrin in a 3/1 ratio.

115 g ureadmapa (0.5 mol) were dissolved in 190 mL $H_2O$ and heated to 70° C. 59 g/37 mL TMCB (0.375 mol) were added within 20 min and the solution was refluxed for 35 minutes at 100° C. The mixture was then cooled to 60° C. in 20 minutes. 13 g/11 mL epichlorohydrin (0.14 mol) were added in 6 min and the temperature was allowed to rise to 70° C. The mixture was then stirred for 1¼ h at 60-70° C. After cooling to room temperature, a nearly colorless viscous solution was obtained.

The IR spectrum of the material showed a pattern in the region between 900 and 1200 $cm^{-1}$ that lies between the one observed for the reaction product of ureadmapa and TMCB (1:1 ratio) and the one for the 1/1 reaction product.

A Hull Cell test, in accordance with the Hull Cell plating test of Example 2 (3 A/5 minutes), was performed using the material. The Hull Cell test yielded a panel that was semi-bright to bright over the whole current density range. The general aspect is comparable to the 1/1 reaction product. The thickness ratio was determined as r=1.3. At comparable concentration, the efficiency was found to be nearly twice as high as the efficiency with the 1/1 product.

Seemingly the drawbacks of the use of epichlorohydrin can be overcome by increasing the TMCB/epichlorohydrin ratio in the reaction while retaining some of the advantages.

Example 9

A class of polymers that gives very bright Zn deposits are the ones based on piperazine epichlorohydrin reactions. It was determined whether piperazine can be copolymerized with ureadmapa to give bright deposits and if piperazine is nucleophilic enough to react with TMCB.

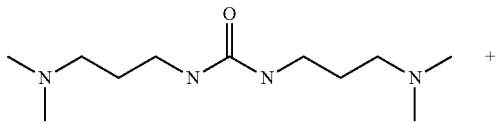

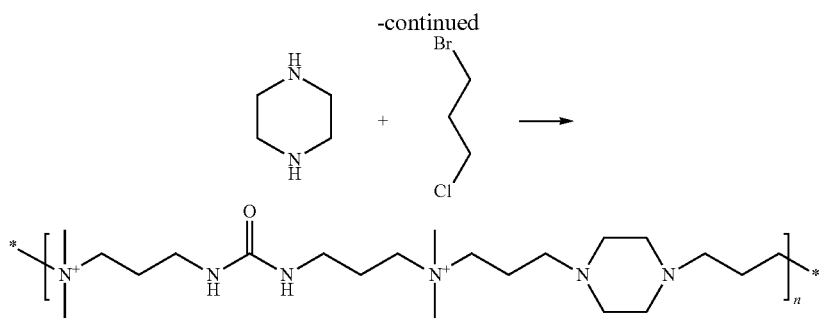

57.5 g ureadmapa (0.25 mol) and 4.3 g piperazine (0.05 mol) were dissolved in 75 mL $H_2O$ and heated to 80° C. 47.2 g/29.5 mL TMCB (0.3 mol) were added in 20 min while the temperature was allowed to rise to 103° C. The solution was refluxed at 100-104° C. for 2 h. The IR spectrum of the material after evaporation of excess water resembled the one for the reaction product of ureadmapa and TMCB (1:1 ratio). An additional band at 2709 $cm^{-1}$ was observed that was assigned to the piperazine unit.

Example 10

A further candidate for copolymerization that might contribute to the overall brightness was imidazole. Imidazole epichlorohydrin polymers are known brightening additives for Zn baths. Additionally, imidazole provides at least one tertiary amine nitrogen per molecule that should be nucleophilic enough to react with TMCB.

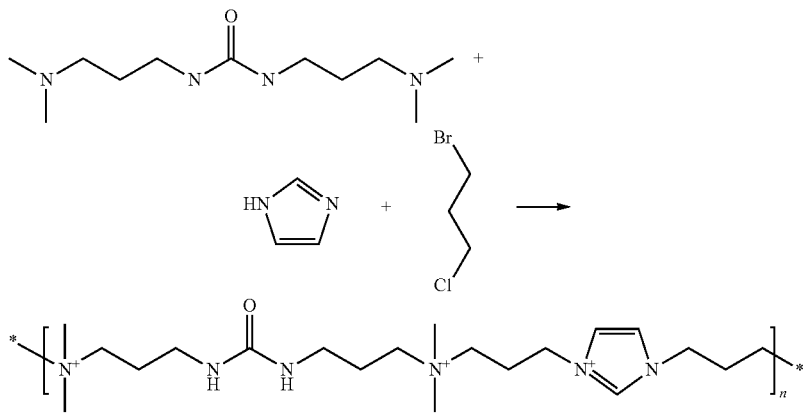

115 g ureadmapa (0.5 mol) and 6.8 g imidazole (0.1 mol) were dissolved in 220 mL $H_2O$ and heated to 95° C. 94 g/59 mL were added in 30 minutes. The solution was refluxed at 97-100° C. for 2 h. After cooling to room temperature, a nearly colorless, viscous solution was obtained.

The IR spectrum of the material resembled the spectrum of the reaction product of ureadmapa and TMCB (1:1 ratio) with an additional band at 2726 $cm^{-1}$.

A Hull Cell plating test was performed in accordance with the Hull Cell plating test of Example 1 (3 A/5 minutes) using the material. The Hull cell test yielded a panel that was bright to semi bright over the whole current density range. The thickness ratio (2.5 cm/7.5 cm) was determined as r=1.4 with satisfactory efficiency. A second test was performed at 1 A for over 15 minutes. Here the aspect of the panel was semi-bright with stripes in the middle current density area. The thickness ratio in this case was determined as r=2.1. The main difference between these two tests was that in the 3 A case a stronger agitation of the bath takes place due to the stronger gas evolution on the cathode. Therefore a Hull cell test was run at 1 A/5 min. with mechanical agitation of the bath. Under these conditions the thickness ratio was found to be r=1.2.

Example 11

An approach to further improve the properties of the imidazole addition may lie in the use of epichlorohydrin as an additional linking agent. In many cases these products gave improved brightness and the polarizing effect of these products have been proven in the experiments described above.

115 g ureadmapa (0.5 mol) and 6.8 g imidazole (0.1 mol) were dissolved in 210 mL $H_2O$ and heated to reflux at 98° C. 70.8 g/44 mL TMCB were added in 20 min and the mixture was refluxed for 1 h. Afterwards the solution was cooled to 62° C. in 20 min and 15.3 g/12.9 mL epichlorohydrin (0.165 mol) were added within 5 minutes. The mixture was then stirred at 60° C.-70° C. for 2 h. After cooling to room temperature, a nearly colorless, viscous solution was obtained.

The IR spectrum of the material after evaporation of excess water was similar to the one obtained without adding epichlorohydrin, but the band at 2726 $cm^{-1}$ was missing and some shoulders for the C—OH bands could be seen between 950 and 1150 $cm^{-1}$.

Hull Cell tests, in accordance with the Hull Cell plating test of Example 2 (3 A/5 minutes), were performed using the material at different concentrations and different current densities generally yielded panels that were semi bright to bright and showed thickness ratios of r=1.2-1.5. The current efficiency was found to be somewhat lower than with the TMCB-only polymer but still acceptable.

Example 12

In a comparative test Jiggle cell panels were plated under the following conditions:
10.5 g/L Zn, 120 g/L NaOH, 10 mL/L 0.2 M benzyl pyridinium carboxylate, 3 A, 30'
1) 10 mL/L Mirapol WT (10%)
2) 10 mL/L the reaction product of ureadmapa and TMCB (1:1) (10%)
3) 10 mL/L the imidazole copolymer of Example 10 (12%)
4) 10 mL/L the imidazole copolymer of Example 11 (12%)

The dilutions were chosen to obtain the same concentrations of the polymers in the bath on a weight/volume basis. The panels were flattened after plating and set aside for evaluation of latent blistering.

The FIGURE shows the position on the panels where the thickness of the deposit was determined by XRF. The following Table shows the thickness measurements taken at these positions and the thickness ratio between the highest and lowest on the front side (3/2) and the highest on the front and the lowest on the back (3/6).

TABLE

| Polymer | 1/μin | 2/μin | 3/μin | 4/μin | 5/μin | 6/μin | 3/2 | 3/6 |
|---|---|---|---|---|---|---|---|---|
| WT | 379 | 287 | 384 | 293 | 474 | 299 | 1.34 | 1.31 |
| Ureadmapa/TMCB | 324 | 322 | 343 | 299 | 444 | 301 | 1.07 | 1.15 |
| EX 10 | 433 | 379 | 442 | 365 | 463 | 351 | 1.17 | 1.26 |
| EX 11 | 335 | 306 | 356 | 175 (?) | 438 | 292 | 1.17 | 1.22 |

The following conclusions can be drawn from this experiment. Concerning the aspect, the imidazole copolymer of Example 10 was judged to give the best brightness followed by the reaction product of ureadmapa and TMCB. Mirapol WT gives the least appealing aspect of the four polymers. Under the given conditions Mirapol WT gives the worst metal distribution while reaction product of ureadmapa and TMCB gives the best. Both the imidazole copolymer of Example 10 and the imidazole copolymer of Example 11 gave metal distributions in between but closer to the reaction product of ureadmapa and TMCB. It is noteworthy that the imidazole copolymer of Example 10 gives the best overall efficiency.

Example 13

The copolymerization of ureadmapa and guanadmapa was investigated. This should combine the superior brightness of the guanadine polymers with the superior metal distribution properties of the urea polymers.

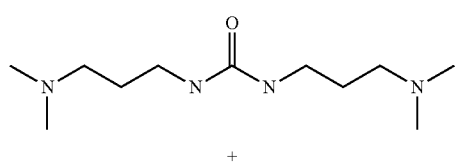

+

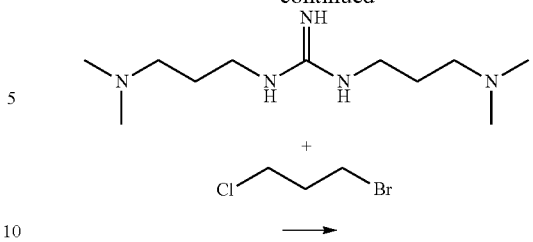

+

In a first experiment 57.5 g ureadmapa (0.25 mol) and 57.3 g guanadmapa (0.25 mol) were dissolved in 195 mL $H_2O$ and heated to 67° C. 78.7 g/49.2 mL TMCB were added within 13 minutes and the mixture was refluxed for 2 h at 98-100° C. After cooling to room temperature a clear, colorless, viscous liquid was obtained.

The IR spectrum showed a pattern that could easily be interpreted as a mixture of reaction product of ureadmapa and TMCB and the guanidine polymer obtained before. The band at 1643 $cm^{-1}$ is much stronger than the one at 1561 $cm^{-1}$, which is due to the presence of the N=C besides the O=C double bond.

A Hull Cell test, in accordance with the Hull Cell plating test of Example 2 (3 A/5 minutes), was performed using the material. The Hull Cell test yielded a panel that is semi-bright to bright. The aspect was similar to the guanidine product than to the reaction product of ureadmapa and TMCB. Also, the metal distribution seems to be influenced more by the guanidine function. The thickness ratio at 2.5 and 7.5 cm was determined to be r=1.7.

Example 14

To verify this, a second experiment was performed with a ratio of ureadmapa/guanadmapa=3/1 was performed.

28.6 g guanadmapa (0.125 mol) and 86.3 g ureadmapa (0.375 mol) were dissolved in 195 mL $H_2O$ and heated to 96° C. 78.7 g/49.2 mL TMCB were added within 20 min and the mixture was refluxed at 100-103° C. for 3½ h. After cooling to room temperature, a clear, colorless viscous solution was obtained.

A Hull Cell test, in accordance with the Hull Cell plating test of Example 2 (3 A/5 minutes), was performed using the material. The Hull cell test yielded panels that were similar in aspect to the ones obtained with the 1:1 ratio. The metal distribution was only slightly improved. The thickness ratio between measurements taken at 2.5 and 7.5 cm from the left edge of the panels depending on the exact conditions was r=1.5-1.7.

From the above description of the invention, those skilled in the art will perceive improvements, changes and modifications. Such improvements, changes and modifications within the skill of the art are intended to be covered by the appended claims.

Having described the invention, the following is claimed:
1. A zinc or zinc alloy electroplating bath comprising:
zinc ions and a brightening agent, the brightening agent comprising at least one polyamine that includes the following formula,

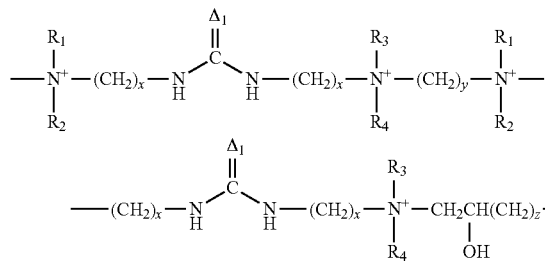

the at least one polyamine consisting essentially of a first repeating unit that has the general formula:

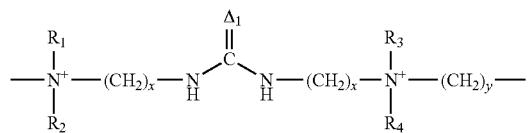

(1)

and a second repeating unit that has the general formula:

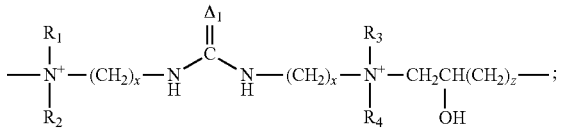

(2A)

where $\Delta_1$ is O, N, or S; x is an integer from 2 to 6; y is an integer from 1 to 6; z is an integer from 1 to 6; and $R_1$, $R_2$, $R_3$, and $R_4$, which is the same or different, is methyl, ethyl, isopropyl, n-propyl, hydroxyethyl, or —$CH_2CH_2$ ($OCH_2CH_2$)$_m$OH; and m is a number between 0-6; wherein the first repeating unit and the second repeating unit are in the same polymer chain.

2. The zinc or zinc alloy electroplating bath of claim 1, the first repeating unit having the following formula:

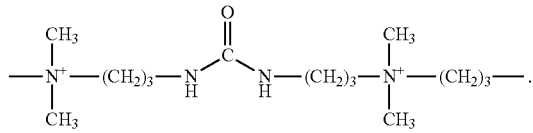

3. The zinc or zinc alloy electroplating bath of claim 1, the polyamine having the following general formula:

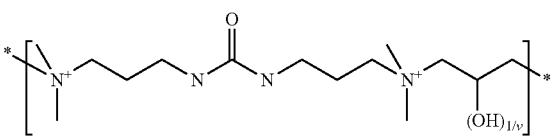

where v is an integer greater than 1.

* * * * *